US012314673B2

(12) United States Patent
Hosseini-Asl et al.

(10) Patent No.: US 12,314,673 B2
(45) **Date of Patent: *May 27, 2025**

(54) GENERATIVE LANGUAGE MODEL FOR FEW-SHOT ASPECT-BASED SENTIMENT ANALYSIS

(71) Applicant: Salesforce, Inc., San Francisco, CA (US)

(72) Inventors: Ehsan Hosseini-Asl, Palo Alto, CA (US); Wenhao Liu, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,708

(22) Filed: Nov. 9, 2023

(65) Prior Publication Data

US 2024/0078389 A1 Mar. 7, 2024

Related U.S. Application Data

(63) Continuation of application No. 17/468,950, filed on Sep. 8, 2021, now Pat. No. 11,853,706.

(60) Provisional application No. 63/189,647, filed on May 17, 2021.

(51) Int. Cl.

| | |
|---|---|
| ***G06F 40/30*** | (2020.01) |
| ***G06F 40/284*** | (2020.01) |
| ***G06N 3/04*** | (2023.01) |
| ***G06N 3/08*** | (2023.01) |

(52) U.S. Cl.
CPC ............ *G06F 40/30* (2020.01); *G06F 40/284* (2020.01); *G06N 3/04* (2013.01); *G06N 3/08* (2013.01)

(58) Field of Classification Search
CPC ......... G06F 40/30; G06F 40/284; G06N 3/04; G06N 3/08
See application file for complete search history.

(56) References Cited

U.S. PATENT DOCUMENTS

| | | | | |
|---|---|---|---|---|
| 10,726,207 B2 * | 7/2020 | He | ........................... | G06N 3/08 |
| 10,755,174 B2 * | 8/2020 | He | .......................... | G06F 40/30 |
| 2018/0032508 A1 * | 2/2018 | Matskevich | .......... | G06F 40/242 |

(Continued)

OTHER PUBLICATIONS

Li, Kun, et al. "Conditional augmentation for aspect term extraction via masked sequence-to-sequence generation." arXiv preprint arxiv:2004.14769 (2020). (Year: 2020).*

(Continued)

*Primary Examiner* — Brian L Albertalli
(74) *Attorney, Agent, or Firm* — Haynes and Boone, LLP

(57) ABSTRACT

Sentiment analysis is a task in natural language processing. The embodiments are directed to using a generative language model to extract an aspect term, aspect category and their corresponding polarities. The generative language model may be trained as a single, joint, and multi-task model. The single-task generative language model determines a term polarity from the aspect term in the sentence or a category polarity from an aspect category in the sentence. The joint-task generative language model determines both the aspect term and the term polarity or the aspect category and the category polarity. The multi-task generative language model determines the aspect term, term polarity, aspect category and category polarity of the sentence.

20 Claims, 8 Drawing Sheets

(56) References Cited

U.S. PATENT DOCUMENTS

| | | | | |
|---|---|---|---|---|
| 2018/0053107 A1* | 2/2018 | Wang | ..................... | G06N 3/044 |
| 2020/0073937 A1* | 3/2020 | Zhao | ..................... | G06F 40/30 |
| 2020/0265196 A1* | 8/2020 | Ravi | ..................... | G06F 40/56 |
| 2021/0089936 A1* | 3/2021 | Zhao | ..................... | G06N 3/006 |
| 2021/0248425 A1* | 8/2021 | Zong | ..................... | G06F 18/2323 |
| 2021/0312124 A1* | 10/2021 | Agarwal | ..................... | G06F 40/30 |
| 2022/0245343 A1* | 8/2022 | Brun | ..................... | G06N 3/08 |

OTHER PUBLICATIONS

Sun, Chi, Luyao Huang, and Xipeng Qiu. "Utilizing BERT for aspect-based sentiment analysis via constructing auxiliary sentence." arXiv preprint arXiv:1903.09588 (2019). (Year: 2019).*

Pang et al., "Thumbs up? Sentiment Classification using Machine Learning Techniques." May 28, 2002. arxiv preprint https://arxiv.org/abs/cs/0205070, pp. 1-9.

Turney, "Thumbs Up or Thumbs Down? Semantic Orientation Applied to Unsupervised Classification of Reviews." 2002. arXiv preprint https://arxiv.org/abs/cs/0212032, pp. 1-8.

Chevalier et al., "The effect of word of mouth on sales: Online book reviews." In Journal of marketing research, 2006, 43(3):345-354.

Pontiki et al., "SemEval—2014 task 4: Aspect based sentiment analysis." In Proceedings of the 8th International Workshop on Semantic Evaluation (SemEval 2014). 2014. pp. 27-35.

Pontiki et al., "Semeval—2016 Task 5: Aspect Based Sentiment Analysis." In International workshop on semantic evaluation. Jan. 2016. pp. 19-30.

Rajpurkar et al., "SQuAD: 100,000+ Questions for Machine Comprehension of Text." Oct. 11, 2016. arXiv preprint https://arxiv.org/abs/1606.05250, pp. 1-10.

Xu et al., "BERT Post-Training for Review Reading Comprehension and Aspect-based Sentiment Analysis." May 4, 2019. arXiv preprint https://arxiv.org/abs/1904.02232, pp. 1-12.

Radford et al., "Improving Language Understanding by Generative Pre-Training." 2018. https://s3-US-west-2.amazonaws.com/openai-assets/research-covers/languageunsupervised/language_understanding_paper.pdf, pp. 1-12.

Brown et al., "Language Models are Few-Shot Learners." Jul. 22, 2020. arXiv preprint https://arxiv.org/abs/2005.14165, pp. 1-75.

Liu, "Sentiment analysis and opinion mining." Synthesis lectures on human language technologies. 2012. 5(1):1-167.

Liu et al., "A Survey of Opinion Mining and Sentiment Analysis." 2012. In Mining Text Data, pp. 415-463.

Cambria et al., "Sentic computing." marketing. 2012. 59(2):557-577.

Hu et al., "Mining and summarizing customer reviews." In Proceedings of the tenth ACM SIGKDD international conference on Knowledge discovery and data mining. 2004. pp. 168-177.

Samha et al., "Aspect-Based Opinion Extraction from Customer Reviews." 2014. arXiv preprint https://arxiv.org/abs/1404.1982. pp. 1-12.

Xu et al., "Double Embeddings and CNN-based Sequence Labeling for Aspect Extraction." May 11, 2018. arXiv preprint https://arxiv.org/abs/1805.04601, pp. 1-7.

Li et al., "Exploiting Coarse-to-Fine Task Transfer for Aspect-Level Sentiment Classification." 2019. In Proceedings of the AAAI Conference on Artificial Intelligence, vol. 33, pp. 4253-4260.

Hochreiter et al., "Long Short-Term Memory." 1997. Neural Computation, 9(8):1735-1780, pp. 1-32.

Devlin et al., "BERT: Pre-training of Deep Bidirectional Transformers for Language Understanding." May 24, 2019. arXiv preprint https://arXiv:1810.04805, pp. 1-16.

Karimi et al., "Improving BERT Performance for Aspect-Based Sentiment Analysis." Mar. 1, 2021. arXiv preprint https://arxiv.org/abs/2010.11731, pp. 1-6.

Lafferty et al., "Conditional Random Fields: Probabilistic Models for Segmenting and Labeling Sequence Data." Jun. 28, 2001. pp. 1-10.

Reddy et al., "Does BERT Understand Sentiment? Leveraging Comparisons between Contextual and Non-Contextual Embeddings to Improve Aspect-based Sentiment Models." Nov. 23, 2020. arXiv preprint https://arxiv.org/abs/2011.11673, pp. 1-6.

Pennington et al., "GloVe: Global Vectors for Word Representation." In Proceedings of the 2014 Conference on empirical methods in natural language processing (EMNLP). Oct. 25-29, 2014. Doha, Qatar. pp. 1532-1543.

Bengio et al., "A Neural Probabilistic Language Model." 2003. Journal of Machine Learning Research 3. 2003. pp. 1137-1155.

Li et al., "Conditional augmentation for aspect term extraction via masked sequence-to-sequence generation." arXivpreprint arXiv:2004.14769 (2020).

Sun et al., "Utilizing BERT for aspect-based sentiment analysis via constructing auxiliary sentence." arXivpreprint arXiv:1903.09588 (2019).

* cited by examiner

200A

200B

300

| Sentence | Task | Model Output |
|---|---|---|
| the sangria's – watered down. | aspect term | <\|term\|> sangria negative |
| | aspect category | <\|category\|> food neutral |
| | aspect term & category | <\|term\|> sangria negative <\|category\|> food negative |
| | groundtruth | <\|term\|> sangria negative <\|category\|> food negative |
| everyone who works there (the host, the bartender, the servers) is so helpful. | aspect term | host positive, bartender neutral, servers positive |
| | aspect category | <\|category\|> service positive |
| | aspect term & category | <\|term\|> host positive, bartender positive, servers positive <\|category\|> service positive |
| | groundtruth | <\|term\|> bartender positive, host positive, servers positive <\|category\|> service positive |
| in mi burrito, here was nothing but dark chicken that had that cooked last week and just warmed up in a microwave taste. | aspect term | <\|term\|> dark chicken negative, microwave taste neutral |
| | aspect category | <\|category\|> food negative |
| | aspect term & category | <\|term\|> chicken negative, taste negative <\|category\|> food negative |
| if you like seafood and or greek food you will love this place though it is not limited to just these things. | aspect term | <\|term\|> seafood positive, greek food positive, place negative |
| | aspect category | <\|term\|> food positive |
| | aspect term & category | <\|term\|> seafood positive, greek food positive <\|category\|> food positive |
| | groundtruth | <\|term\|> greek food positive, seafood positive <\|category\|> food positive |

Table 4: Examples of correct predictions in multi-task learning.

GENERATIVE LANGUAGE MODEL FOR FEW-SHOT ASPECT-BASED SENTIMENT ANALYSIS

CROSS-REFERENCE TO RELATED APPLICATIONS

This application is a continuation of U.S. patent application Ser. No. 17/468,950, filed Sep. 8, 2021, now allowed, which is a nonprovisional of and claims priority under 35 U.S.C. 119 to U.S. Provisional Application No. 63/189,647, filed May 17, 2021, each of which are hereby expressly incorporated by reference herein in their entirety.

TECHNICAL FIELD

The disclosure relates generally to generative language models, and more specifically to performing aspect-based sentiment analysis on user generated text using the generative language models.

BACKGROUND

Sentiment analysis is an important task in natural language processing. Sentiment analysis is typically characterized in three categories: document, sentence, and aspect level. Conventional pre-trained language models are often used to achieve state-of-the-art results, especially when training data is scarce. It is also common to fine-tune the pre-trained language models on the downstream tasks, usually by adding task-specific layers on top of the models.

Sentiment analysis aims at detecting the overall polarity of a user generated text, which describes the user opinion for an entity. However, user may express opinion about an entity at different granularity. For example, a user may give an overall rate about a restaurant service, and then explain in fine-grained review specific aspects, such as food quality, waiting time, waitress service, environment, etc. Aspect-based sentiment analysis aims at addressing this task. To do so, the user sentiment is annotated at coarse and fine-grained levels. Moreover, a user can express conflicting opinions for different aspects of the same entity.

Conventionally, deep learning models applied to aspect-based sentiment analysis (ABSA) tasks, were employed as a single task model, similar to the machine reading comprehension task (MRC). For example, a pre-trained BERT language model is fine-tuned on ABSA term polarity prediction (single task) as a classifier. In this approach, a task-specific layer is fine-tuned on a downstream task, such as a layer for aspect term polarity classification, and a different layer for aspect term span extraction.

Conventional works on the ABSA task focused on developing feature engineered models. One model may be based on convolutional neural network (CNN) for aspect term extraction task only. This approach is based on using two types of pre-trained embeddings, a general-purpose embedding and a domain-specific embedding. Then, a softmax classification layer is used to classify each word that identifies aspect term start and end positions, or non-related words.

Another conventional model is a multi-granularity alignment network (MGAN). This is a coarse-to-fine approach for single-task aspect polarity prediction using recurrent neural network (RNN). This approach defines aspect category as a coarse-level and aspect term as fine-level sentiments. MGAN further leverages high-resource out-of-domain data for pre-training. In this way, the knowledge is transferred from the coarse-grain domain (single-opinion prediction) to multi-grain domains (ABSA task).

Another conventional model is the Bidirectional Encoder Representations from Transformers (BERT) model. Bert is a pretrained bidirectional language model for language understanding and which presents a powerful contextualized word representation for downstream tasks. BERT may be used for feature extraction in the ABSA task. For example, the review reading comprehension (RRC) model defines the ABSA task as question answering, uses BERT as base model, with different heads for aspect term extraction (as span extraction) and term polarity prediction. To enhance the RRC performance, the RRC model uses a post-training algorithm. The post-training algorithm may additionally pre-train the model on the out-of-domain data from various datasets, such as Amazon and Yelp review datasets, and additionally on MRC question answering dataset.

Another approach is based on a conditional random field (CRF) combined with BERT for aspect term extraction and term polarity prediction. The two modules are employed for improving aspect term extraction and term polarity prediction of the BERT model. First, a parallel approach is used which combines predictions for aspect term and polarity from the last four layers of BERT in a parallel way. Moreover, a hierarchical aggregation module is also examined, where predictions of previous layers of BERT are fed into the next layer.

Another approach combines the GLOVE pre-trained embedding with deep contextualized representation of BERT to enhance word representation vector for predicting aspect term polarity. The proposed BERT-IL model predicts aspect term polarity by learning similarity between the GLOVE representation vector of aspect term and its contextualized representation extracted from BERT. In the approach, first the aspect term representations are extracted from multiple layers of BERT, followed by a self-attention layer. Then, the BERT-IL is further fine-tuned on ABSA task for better performance.

BRIEF DESCRIPTION OF THE DRAWINGS

FIG. 3 is a table showing the input and output of the aspect-based sentiment analysis generative language model for various tasks, according to some embodiments.

Figure 1:
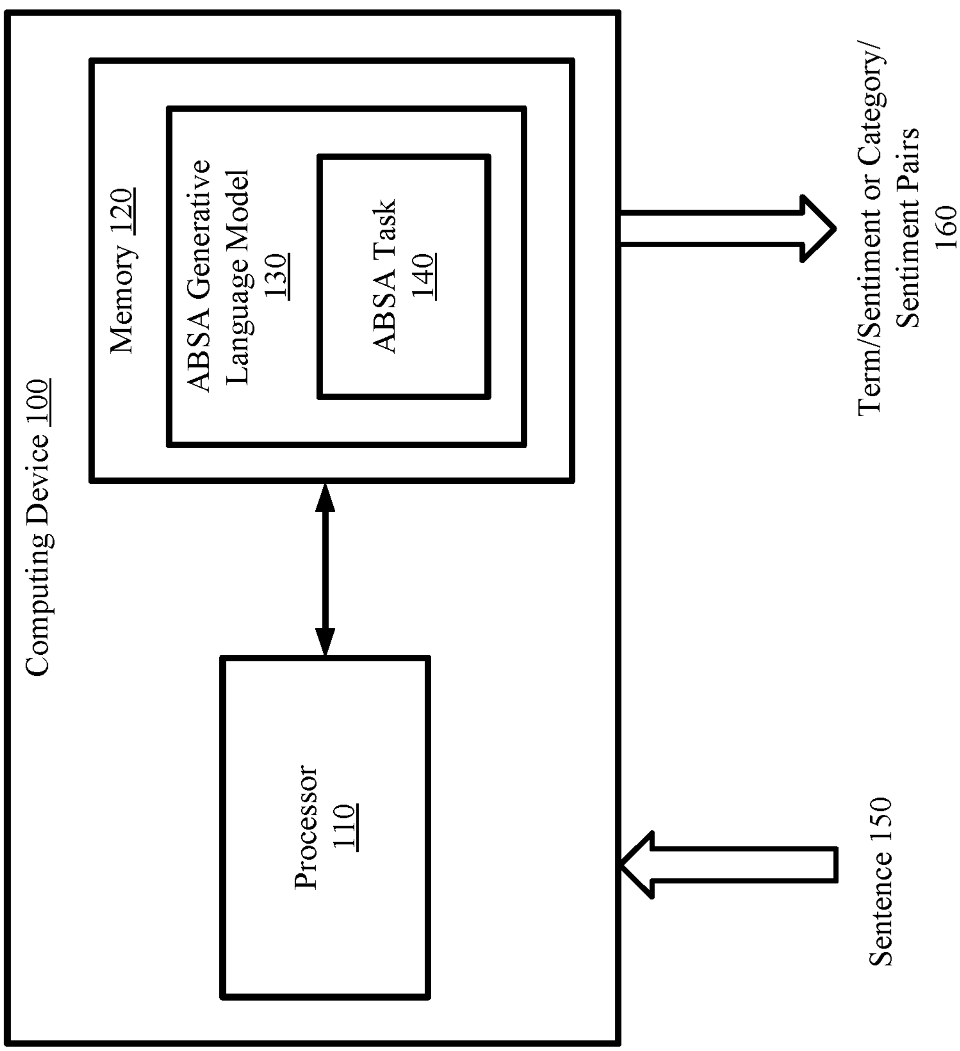
FIG. 1 is a simplified diagram of a computing device for implementing an aspect-based sentiment analysis generative language model for sentiment analysis, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

A generative language model with unidirectional self-attention, such as a GPT2 model, is pre-trained by causal language modeling loss, has shown promising performance when fine-tuned on downstream tasks. The GPT2 model uses the causal language modeling loss to predict the next word given the history. Using this approach, the generative language model learns a downstream task as language generation. The downstream task is represented as a serialized text. A generative language model, such as GPT3 model, is a large-scale language model with a few-shot ability. The GPT2 model learns to solve downstream task when conditioned on few examples in the prompt, without any parameter update (which is referred to as in-context learning).

The embodiments are directed to a generative language model, such as a GPT2 or GPT2 model to perform an aspect-based sentiment analysis (ABSA) task. The generative language model achieves better performance compared to previous state-of-the-art models (such as models based on a pre-trained BERT model) on few-shot and full-shot settings, for single-task polarity prediction of aspect term and aspect category. For example, using one percent, e.g. 20 examples of training data on a restaurant domain for aspect term polarity prediction task, the ABSA GPT2 model outperforms BERT-PT. Moreover, when fine-tuned on multiple tasks, such as aspect term, term polarity, aspect category detection, and category polarity, the ABSA GPT2 model improves the single-task performance, such as aspect term extraction.

The embodiments are directed to an ABSA generative language model that may reformulate aspect-based sentiment analysis as language generation. In this way, the ABSA generative language model may be used with no additional head for downstream tasks.

The embodiments are directed to the ABSA generative language model that may improve full-shot performance on all single polarity prediction tasks without additional pre-training on out-of-domain data.

The embodiments are directed to the ABSA generative language model that may be a robust generative model on few-shot setting, which outperforms previous state-of-the-art models.

The embodiments are directed to a new method for creating an input sequence during training to improve few-shot performance of the ABSA generative language model.

Further, qualitative analysis indicates that using joint and multi-task training, further improves single-task performances, such as aspect term extraction.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

FIG. 1 is a simplified diagram of a computing device 100, according to some embodiments. Although FIG. 1 depicts one computing device 100, the embodiments can also be implemented on multiple computing devices. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. For example, as shown, memory 120 includes instructions for an aspect-based sentiment analysis (ABSA) generative language model 130 and ABSA tasks 140. The ABSA generative language model 130 may be trained to perform one or more ABSA tasks 140 on a sentence or other user generated text. An example ABSA generative language model 130 may be a generative pre-trained transformer model, such as a GPT2 or GPT3 model. ABSA task 140 may be an aspect term extraction task, an aspect term polarity task, an aspect category detection task, and aspect category polarity task. The ABSA task 140 may also be implemented as a single-task, joint-task, or a multi-task, which is a combination of one or more sentiment analysis tasks, which are discussed in detail below.

ABSA generative language model 130 may receive one or more sentences 150 or other user generated text. Sentences 150 may express users' opinions or sentiments. Sentence 150 may include one or more words. Each word may be referred to as a term. Example sentence 150 may be a review sentence that reviews a particular product or service. ABSA generative language model 130 may use ABSA task 140 to identify users' opinions or sentiments of sentence 150 or individual terms in sentence 150 which is an output 160. Depending on the ABSA task 140, output 160 may extract an aspect term from the terms in sentence 150, term polarity for the extracted term, detect an aspect category of sentence 150, and determine category polarity of the aspect category. In some instances, output 160 may include one or more pairs. An example pair may include an aspect term and term polarity. Another example pair may include aspect category and category polarity. The ABSA generative language model 130 may generate multiple pairs from sentence 150.

Unlike conventional sentiment analysis tasks, ABSA task 140 may predict fine-grained sentiment of multiple aspect terms of sentence 150 as well as aspect category which is the sentiment of sentence 150. To predict aspect and sentiment of multiple terms and category, ABSA task 140 may include one or more of an aspect term extraction task, aspect term polarity task, aspect category detection task, and an aspect category polarity task.

Figure 2A:
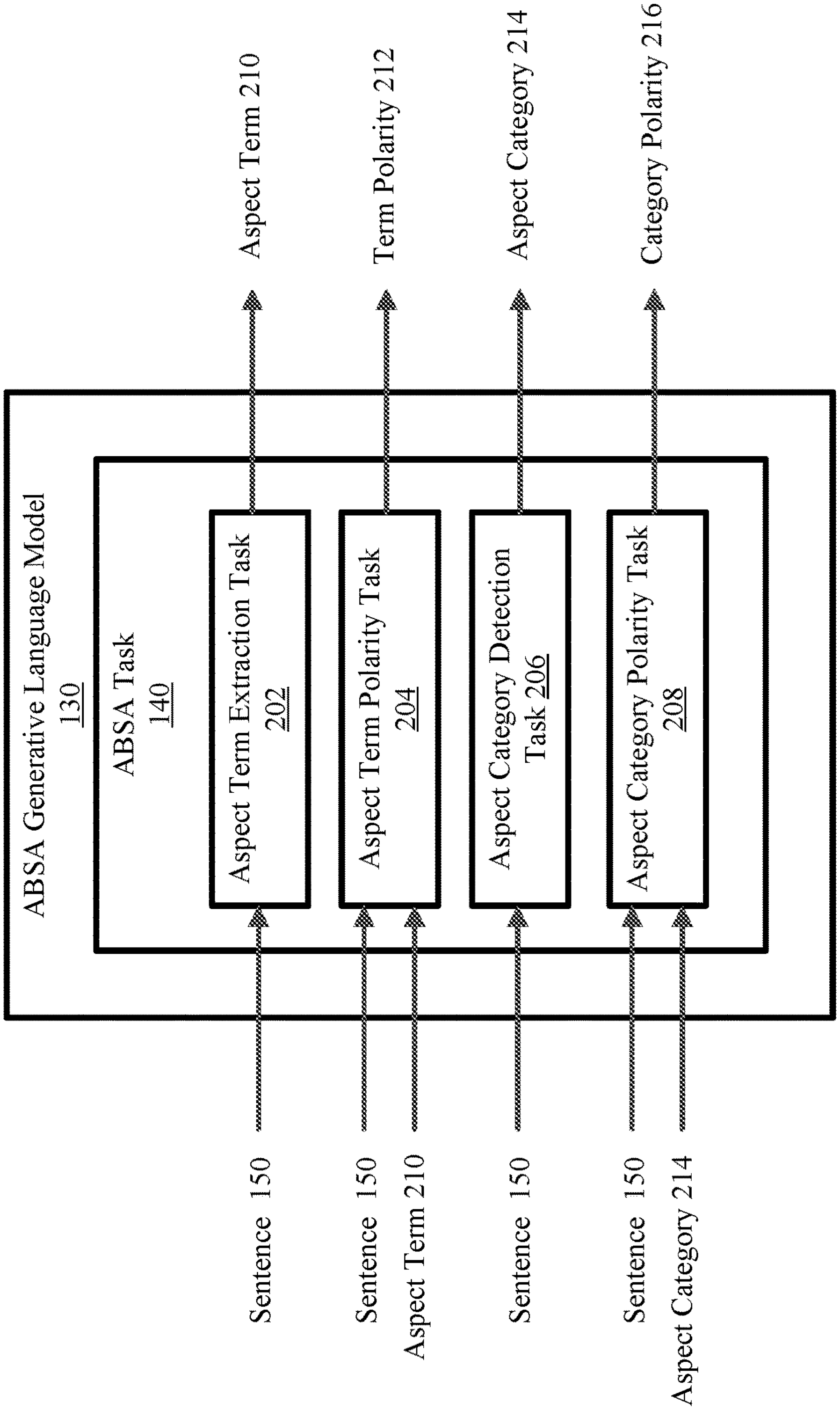
FIGS. 2A, 2B and 2C are block diagrams of the aspect-based sentiment analysis generative language model for sentiment analysis, according to some embodiments.
Figure 2B:
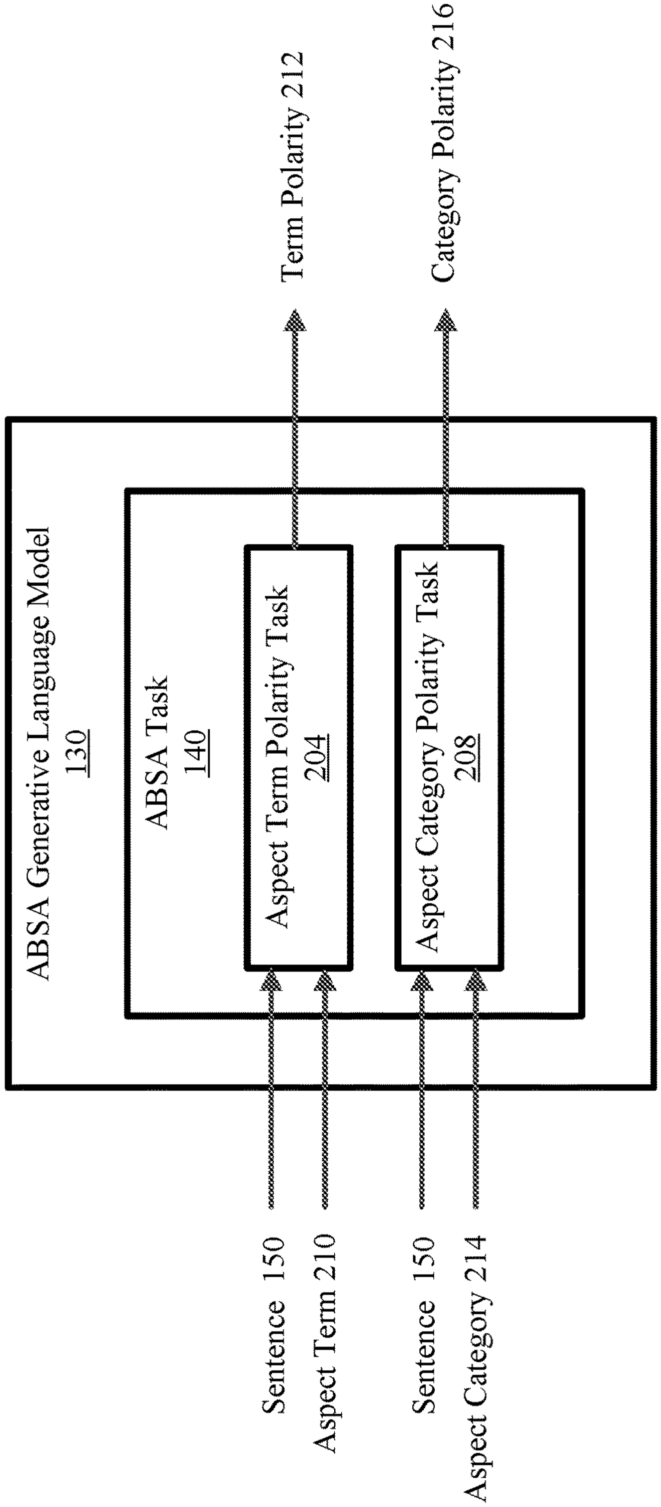
Figure 2C:
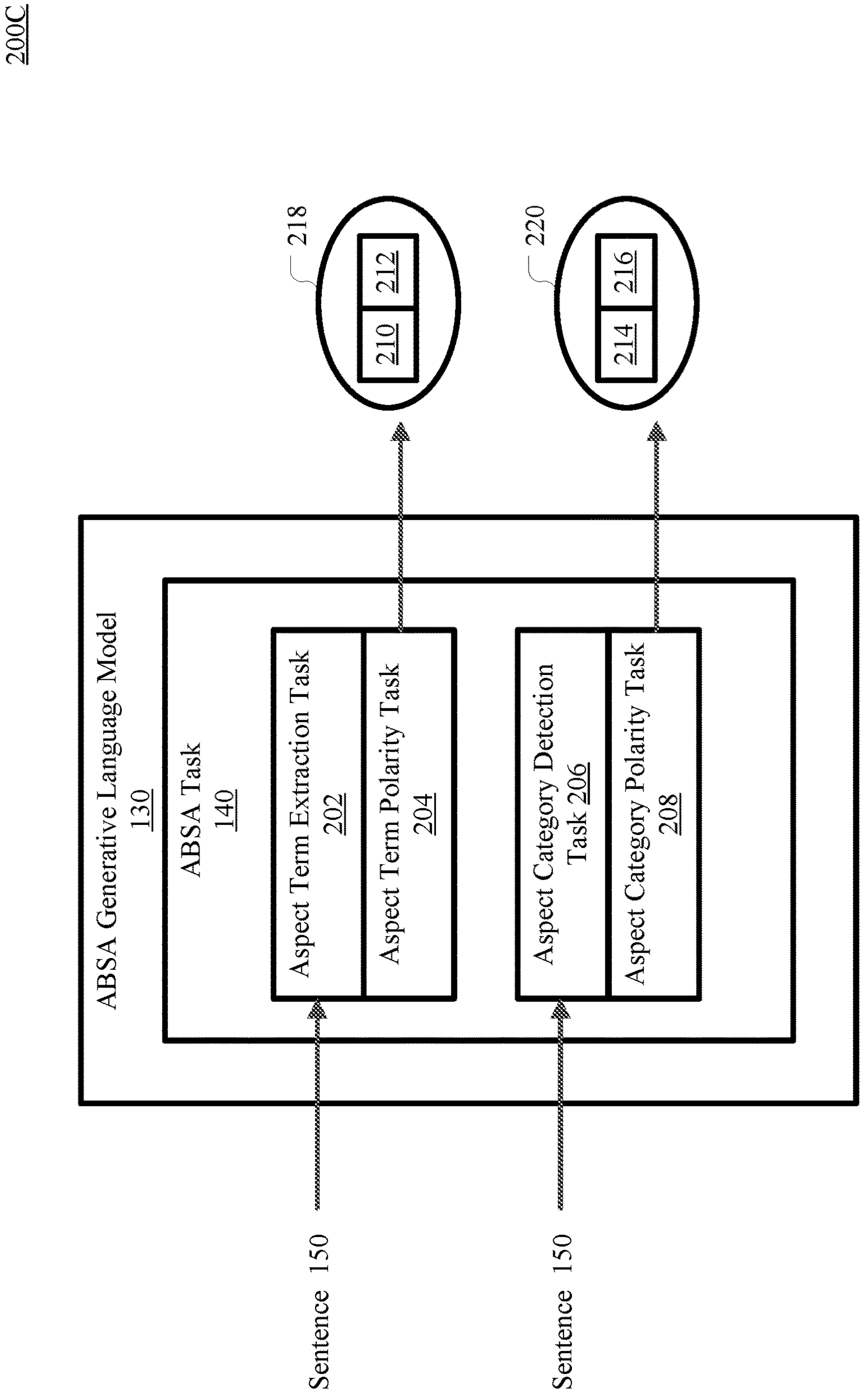

FIGS. 2A, 2B and 2C are block diagrams 200A, 200B and 200C of an ABSA generative language model, according to some embodiments.

As discussed with respect to FIG. 1, ABSA generative language model 130 includes ABSA task 140. ABSA task 140 may be one or a combination of aspect term extraction task 202, aspect term polarity task 204, aspect category detection task 206, and an aspect category polarity task 208.

The aspect term extraction task 202 may determine which terms in sentence 150 are aspect terms 210. Aspect terms 210 are terms an opinion or sentiment is expressed. Each aspect term 210 may be a word, a word span that spans several words, multiple words, or some other span of text. The aspect term extraction task 202 may predict all potential aspect terms to be predicted, including terms that have neural polarity where no opinion is expressed.

The aspect term polarity task 204 may receive sentence 150 and aspect term 210 and predict term polarity 212 for an aspect term 210. Term polarity 212 is the polarity of opinion expressed in the aspect term 210. Example opinions may be positive, negative, neutral, and conflict.

The aspect category detection task 206 predicts may detect for sentence 150 an aspect category 214 for which an opinion is expressed. Aspect category 214 may be detected from a given a set of predefined aspect categories. Example predefined set of aspect categories for sentence 150 that is a review sentence may be PRICE, FOOD, SERVICE, AMBIENCE, ANECDOTE, and MISCELLANEOUS. In some embodiments, and output of the aspect category detection task 206 may be aspect category 214 that is formatted into one or more pairs. Each pair may include an entity and an attribute. An example pair may be RESTAURANT #PRICE or FOOD #QUALITY.

The aspect category polarity task 208 receives as input aspect category 214 and sentence 150 and predicts the sentiment of the category which is category polarity. Example sentiments may be positive, negative, neutral, conflict.

ABSA generative language model 130 may process aspect term extraction task 202, aspect term polarity task 204, aspect category detection task 206, and/or aspect category polarity task 208 in an auto-regressive, generative manner. The goal of ABSA generative language model 130 is to learn the data distribution p(x), where $x=(x_1, \ldots, x_n)$ is a sequence of n symbols. In order to model p(x), ABSA generative language model 130 may factor the distribution of a single sequence p(x) using chain rule of probability. During the training stage, the neural network in the ABSA generative language model 130 which is parameterized by θ, may be trained using negative log-likelihood as illustrated below:

$$p\theta(x)=n\Pi t=0 p_\theta(x_t|x_{<t}) \quad (1)$$

$$L_D=-kn\Sigma\Sigma k=1t=1 \log \log p_\theta(x_t^k|x_{<t}^k) \quad (2)$$

During the inference stage, the neural-based ABSA generative language model 130 sequentially generates tokens by conditioning on the input example $x^k$ and past generated tokens.

In some embodiments, ABSA task 140 may consist of a single example, $x^k$ which contains a sentence $S^k$, I aspect term and term polarity pairs, and J pairs of aspect category and category polarity, $$T^k=\{TP_i^k=(t_i^k,pt_i^k);i\in I\} \quad (3)$$

$$C^k=\{CP_j^k=(c_j^k,pc_j^k);j\in J\} \quad (4)$$

where $t_i^k$, $pt_i^k$, and $TP_i^k$ are i-th aspect term, term polarity, and their pair respectively, and $c_j^k$ and $pc_j^k$, and $CP_j^k$ are j-th aspect category, category polarity, and their pair for k-th example, respectively.

FIG. 2B illustrates the ABSA generative language model 130 performing a single-task polarity prediction. In a single-task polarity prediction, the ABSA task 140 of the ABSA generative language model 130 is trained to predict term polarity 212 or category polarity 216. To generate polarity during the inference stage, the input to the ABSA generative language model 130 may comprise of k-th sentence (sentence 150) and a corresponding aspect term 210, as follows:

$$pt_i^k=LM_{term}(S^k,t_i^k) \quad (5)$$

The term $LM_{term}$ in equation (5) refers to ABSA generative language model 130 that is trained on the aspect term dataset.

The same method is used for generating category polarity $pc_j^k$ (category polarity 216) using the sentence $S^k$ (sentence 150) and aspect category $c_j^k$ (aspect category 214) as input to ABSA generative language model 130, as follows:

$$pc_j^k=LM_{category}(S^k,c_i^k) \quad (6)$$

The term $LM_{category}$ in equation (6) refers to ABSA generative language model 130 that is trained on the aspect category dataset. In some embodiments, ABSA generative language model 130 may be trained on the aspect term dataset, aspect category dataset, or both.

FIG. 2C illustrates the ABSA generative language model 130 performing a joint or multi-task polarity prediction. In the joint-task prediction, ABSA task 140 of the ABSA generative language model 130 generates one or more pairs 218 that include aspect term 210 and term polarity 212 jointly or one or more pairs 220 that include aspect category 214 and category polarity 216 jointly. In the multi-task prediction, ABSA task 140 of the ABSA generative language model 130 generates one or more pairs 218 that include aspect term 210 and term polarity 212 and one or more pairs 220 that include aspect category 214 and category polarity 216.

To jointly generate pairs 218 that includes aspect term 210 and term polarity 212, the input to the ABSA generative language model 130 receives the review sentence $S^k$ (sentence 150), which then generates pairs 218, where each pair 218 include aspect term 210 and term polarity 212 in one sequential (auto-regressive) generation process, as follows:

$$T^k=LM_{term}(S^k) \quad (7)$$

where $T^k$ is the set of all aspect term and polarity pairs (pairs 218). Similarly, to jointly generate pairs 220, the ABSA generative language model 130 receives the review sentence $S^k$ (sentence 150), which then generates pairs 220, where each pair 220 includes aspect category 214 and category polarity 216 in one sequential (auto-regressive) generation process, as follows $$C^k=LM_{category}(S^k) \quad (8)$$

where $C^k$ is the set of aspect category and polarity pairs (pairs 218).

In some embodiments, the ABSA task 140 of the ABSA generative language model 130 may be a multi-task that generates both pairs 218 that include aspect term 210 and term polarity 212 and pairs 220 that include aspect category 214 and category polarity 216 jointly. In this case, during the training stage the ABSA generative language model 130 learns to generate I aspect term pairs 218 and J aspect category pairs 220 in one sequential generation. During the inference stage, ABSA task 140 of the ABSA generative language model 130 generates pairs 218 and pairs 220 as follows:

$$[T^k, C^k] = \mathrm{LM}(S^k) \quad (9)$$

FIG. 3 is a diagram 300 illustrating examples of predictions in a joint and multi-task learning, according to some embodiments. When ABSA task 140 is a joint task, the ABSA task 140 determines aspect term 210 and term polarity 212 or aspect category 214 and category polarity 216. For example, for sentence 150 that is "the sangria's—watered down," ABSA generative language model 130 and ABSA task 140 determines aspect term "sangria" and term polarity 212 as "negative." In another example, for sentence 150 that is "the sangria's—watered down," ABSA generative language model 130 and ABSA task 140 determines aspect category "food" and category polarity 216 as "neutral."

As discussed above, ABSA task 140 may be a multi-task that uses a multi-task trained ABSA generative language model to determine pairs 218 that include aspect term 210 and term polarity 212 from sentence 150 and also pairs 220 that include aspect category 214 and category polarity 216. For example, for sentence 150 that is "the sangria's—watered down," the ABSA generative language model 130 may determine pair 218 that includes aspect term "sangria" and term polarity "negative," and pair 220 that includes aspect category "food" and category polarity "negative."

The ABSA generative language model 130 may have a greater accuracy for determining sentiments when the ABSA generative language model is trained to process multi-tasks rather than joint or single tasks. For example, for sentence 150 "the sangria's—watered down," the ABSA generative language model 130 trained to process a joint-task determined the polarity category "neutral" for aspect category "food," while the ABSA generative language model 130 trained to process a multi-task determined the polarity category "negative" for aspect category "food." When compared to the ground truth for sentence 150, the ABSA generative language model 130 trained to processes a multi-task correctly determined the category polarity is "negative" for aspect category "food."

Going back to FIG. 1, ABSA generative language model 130 is trained during a training stage to determine a single task, joint-task or multi-task. In some embodiments, a training example for aspect term dataset, may include a concatenation of a review sentence, such as sentence 150, aspect term 210 and term polarity 212, which may be represented as $x^k=[S^k; T^k]$. This training example is used to train ABSA generative language model 130 $\mathrm{LM}_{term}$ to determine the term polarity during the single-task training and aspect term and polarity term during joint-task training. In some embodiments, a training example from aspect category dataset, may include a concatenation of a review sentence, such as sentence 150, aspect category 214 and category polarity 216, which may be represented as $x^k=[S^k; C^k]$. This training example is used to train ABSA generative language model 130 $\mathrm{LM}_{category}$ to determine the category polarity during the single-task training and aspect category and polarity category during the joint-task training.

In some embodiments, ABSA generative language model 130 that is $\mathrm{LM}_{term}$ may be trained on training sequences, where review sentence $S^k$ (sentence 150) may be concatenated with a single aspect term and term polarity. In this case, multiple training samples are created for k-th sentence as follows: $\{x_i^k=[S^k; TP_i^k]; i \in I\}$.

In some embodiments, ABSA generative language model 130 may be evaluated using two datasets for ABSA task 140. ABSA task 140 that may be a SemEval14 task may include the four tasks described above. ABSA task 140 that may be a SemEval16 task may include a fifth task, which contains two of the four tasks described above for sentence 150 text level review data in multiple languages.

To evaluate the proposed ABSA generative language model 130 and BERT baseline models on few-shot setting, training set for aspect term and aspect category domains may be sub-sampled. For an aspect term, a training set to smaller sizes, e.g., [1%, 5%, 10%, 20%] is randomly sub-sampled. In this case, 1% few-shot training set contains 20 sentences. For aspect category, since there is a predefined set of categories, examples for each category are randomly sub-sampled with different number of examples, e.g., [1, 5, 10, 20].

The distribution of train and test splits for each domain from a dataset is shown in Table 1, below:

TABLE I

Dataset Distribution

| Dataset | Domain | Train | Test | Total |
|---|---|---|---|---|
| SemEval14 | Restaurant | 3041 | 800 | 3841 |
| | Laptop | 3045 | 800 | 3845 |
| SemEval16 | Restaurant | 2000 | 676 | 2676 |
| | Laptop | 2500 | 808 | 3308 |

Notably, the previous baselines created customized validation sets from a training set. Since no official validation set is released for SemEval14 and SemEval16 datasets, and in order to have unified evaluations, the trial set may be used as validation, and excluded from the training set. Moreover, conventional models exclude examples with polarity of conflict, since it is a difficult prediction. However, to analyze the ability of ABSA generative model language 130 these examples are included in the evaluation.

In some embodiments, performance evaluation of aspect term polarity and aspect category polarity single-tasks is based on an accuracy metric. It is measured by counting the number of aspect term and aspect category polarities which are correctly predicted. The evaluation of aspect term extraction and aspect category detection are measured by F1 metric.

Evaluation of joint and multi-task models is measured by joint accuracy. This means that for an example sentence $S^k$, if all the aspect term and term polarity predictions are correct, it is assumed as a correct prediction.

As discussed above, the embodiments are directed to a generative language model 130 for aspect based sentiment analysis (ABSA). By reformulating the ABSA task 140 as a language generation task, the ABSA generative language model 130 learns to predict aspects and their expressed opinion via language generation. Evaluation results on a single-task polarity prediction on few and full shot setting indicates that the proposed approach outperforms conventional models, which are based on discriminative classification using a BERT as encoder. On join-task (aspect term and term polarity task, or aspect category and category polarity task) and multi-task (aspect term, term polarity, aspect category prediction, and category polarity tasks), the proposed model shows better performance on single-task polarity prediction. Moreover, qualitative analysis indicates that using language generation on multi task setting improve the model prediction using supervision across aspect term and aspect category.

Figure 4:
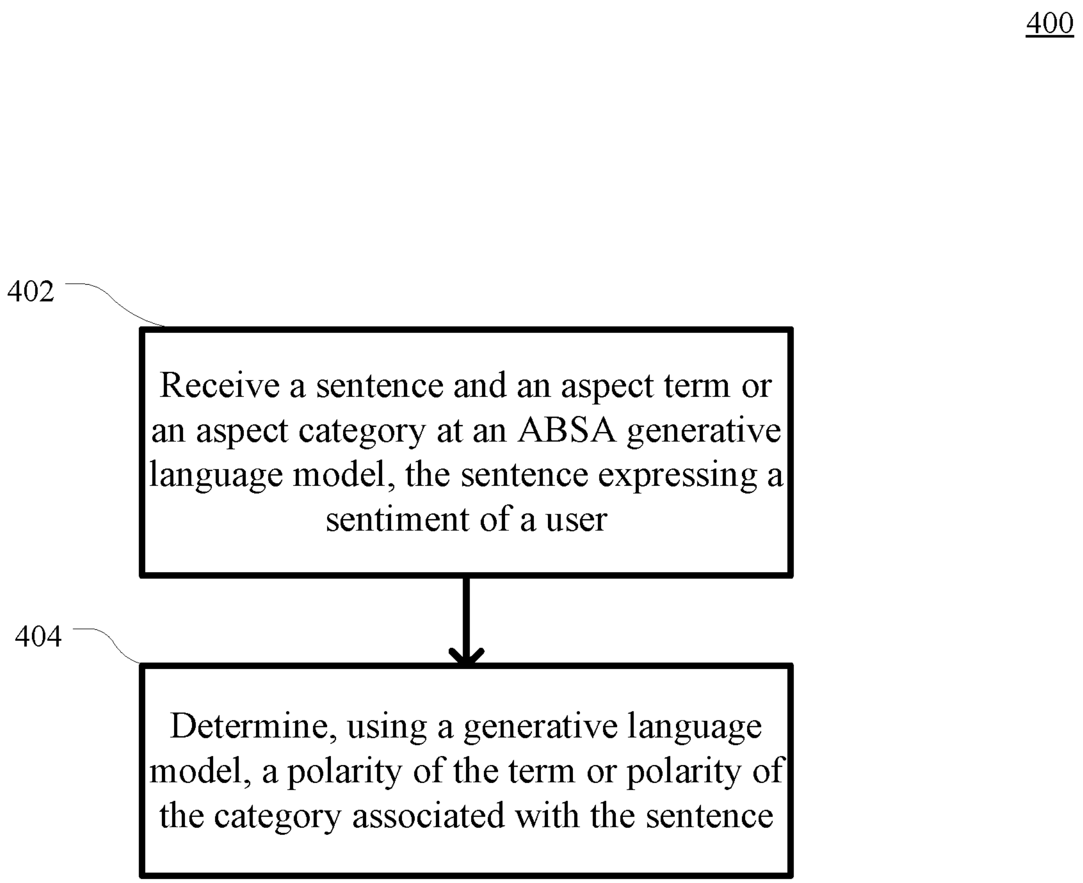
FIGS. 4-6 are flowcharts for analyzing the sentiment in a sentence using the aspect-based sentiment analysis generative language model for a single, joint, and multi-tasks, according to some embodiments.

FIG. 4 is a simplified diagram of a method 400 for using a ABSA generative language model trained on a single task to generate polarity that describes the sentiment of the sentence, according to some embodiments. One or more of the processes 402-404 of method 400 may be implemented, at least in part, in the form of executable code stored on non-transitory, tangible, machine-readable media that when run by one or more processors may cause the one or more processors to perform one or more of the processes 402-404.

At process 402, a sentence and aspect term or aspect category are received. For example, ABSA generative language model 130 trained to perform a single task receives sentence 150 and aspect term 210 or sentence 150 and aspect category 214. Sentence 150 describes a sentiment. For example, as illustrated in FIG. 3, ABSA generative language model 130 may receive sentence "everyone who works there (the host, the bartender, the servers) is so helpful" and aspect terms "host," "bartender," and servers." In another example, ABSA generative language model 130 may receive sentence "everyone who works there (the host, the bartender, the servers) is so helpful" and aspect category "service."

At process 404, polarity for the term or category from the sentence and aspect term or aspect category is generated. For example, ABSA generative language model 130 trained on a single task performs ABSA task 140 on the sentence 150 in a single sequence. ABSA generative language model 130 may generate term polarity 212 from sentence 150 and aspect term 210 or category polarity 216 from sentence 150 and aspect category 214. For example, as illustrated in FIG. 3, ABSA generative language model 130 may generate polarity term "positive" for aspect term "host," polarity term "neural" for aspect term "bartender," and polarity term "positive" for aspect term "servers." In another example, ABSA generative language model 130 may generate polarity category "positive" for aspect category "service."

Figure 5:
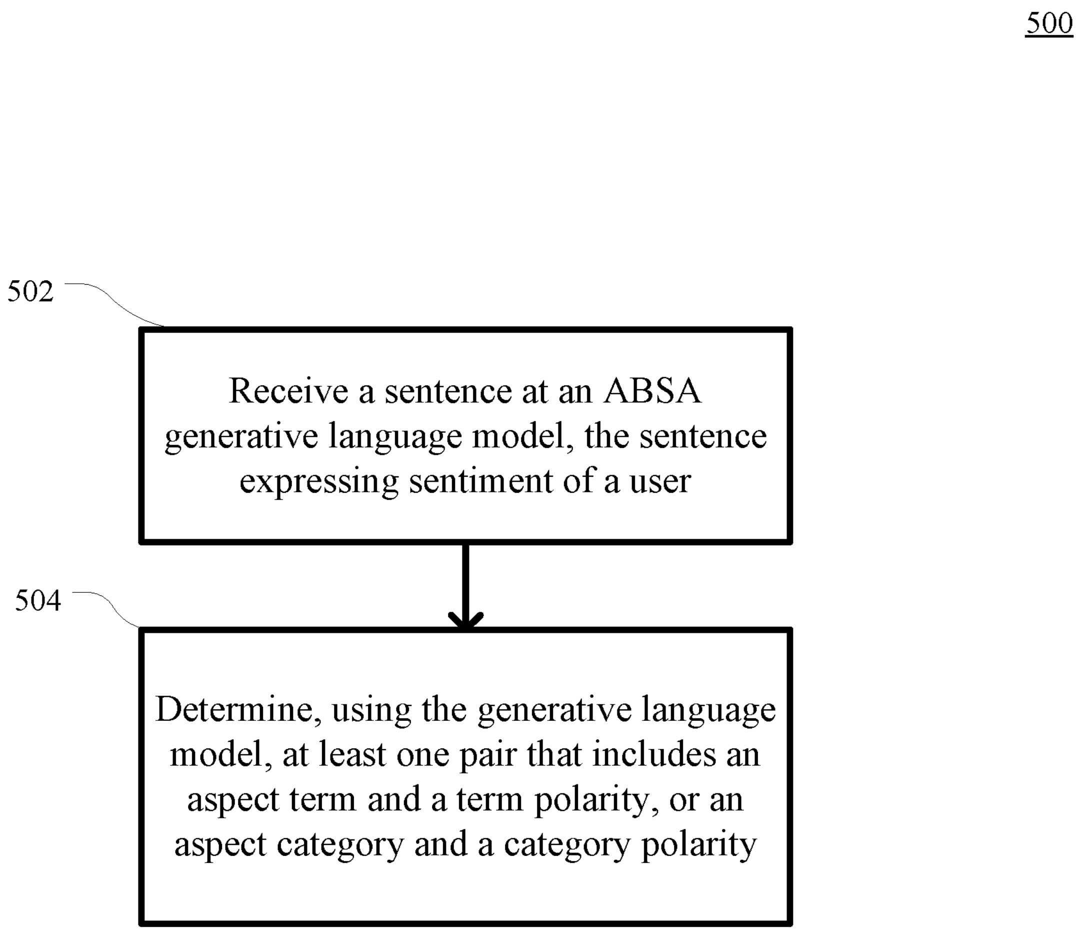

FIG. 5 is a simplified diagram of a method 500 for using an ABSA generative language model trained on a joint-task to generate polarity that describes the sentiment of the sentence, according to some embodiments. One or more of the processes 502-504 of method 500 may be implemented, at least in part, in the form of executable code stored on non-transitory, tangible, machine-readable media that when run by one or more processors may cause the one or more processors to perform one or more of the processes 502-504.

At process 502, a sentence is received. For example, ABSA generative language model 130 trained to perform a joint task receives sentence 150. Sentence 150 describes a sentiment. For example, as illustrated in FIG. 3, ABSA generative language model 130 may receive sentence "everyone who works there (the host, the bartender, the servers) is so helpful."

At process 504, generate pairs including an aspect term and term polarity or aspect category and category polarity. For example, ABSA generative language model 130 performs ABSA task 140 on the sentence 150 that is a joint task as a single sequence. ABSA generative language model 130 may generate pairs 218 or 220 where each pair in pairs 218 includes aspect term 210 and term polarity 212 or each pair in pairs 218 includes aspect category 214 and category polarity 216. For example, as illustrated in FIG. 3, ABSA generative language model 130 may generate three pairs 218, where the first pair includes aspect term "host" and polarity term "positive," the second pair includes aspect term "bartender" and polarity term "neutral," and a third pair that includes aspect term "servers" and polarity term "positive." In another example, ABSA generative language model 130 may generate pair 218 that includes aspect category "service" and polarity category "positive."

Figure 6:
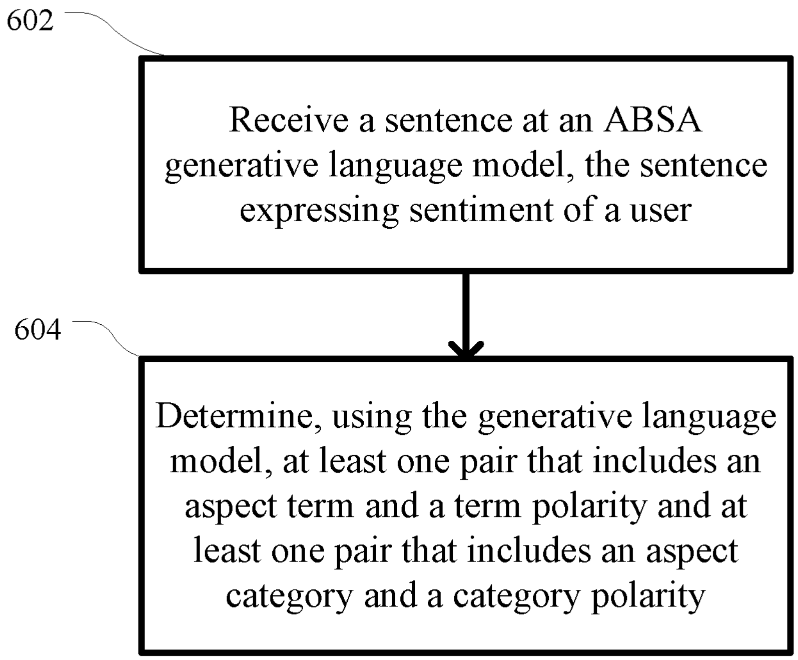

FIG. 6 is a simplified diagram of a method 600 for using a multi-task in a ABSA generative language model to generate polarity that describes the sentiment of the sentence, according to some embodiments. One or more of the processes 602-604 of method 600 may be implemented, at least in part, in the form of executable code stored on non-transitory, tangible, machine-readable media that when run by one or more processors may cause the one or more processors to perform one or more of the processes 602-604.

At process 602, a sentence is received. For example, ABSA generative language model 130 trained to perform a multi-task receives sentence 150. Sentence 150 describes a sentiment. For example, as illustrated in FIG. 3, ABSA generative language model 130 may receive sentence "everyone who works there (the host, the bartender, the servers) is so helpful."

At process 604, pairs including a first pair including an aspect term and term polarity and a second pair including aspect category and category polarity are generated. For example, a multi-task trained ABSA generative language model 130 performs ABSA task 140 on the sentence 150. ABSA generative language model 130 may generate at least one pair 218 and at least one pair 220 in a single sequence. Each pair in pairs 220 includes aspect term 210 and term polarity 212. For example, as illustrated in FIG. 3, ABSA generative language model 130 may generate three pairs 218 for the sentence received in process 602, where the first pair includes aspect term "host" and polarity term "positive," the second pair includes aspect term "bartender" and polarity term "positive," and a third pair that includes aspect term "servers" and polarity term "positive." Each pair in pairs 220 includes aspect category 214 and category polarity 216. For example, as illustrated in FIG. 3, ABSA generative language model 130 may generate pair 220 that includes aspect category "service" and polarity category "positive."

Notably, the multi-task trained ABSA generative language model 130 may be more accurate than joint-task trained ABSA generative language model 130. This is illustrated in FIG. 3 and methods 500 and 600, where the term polarities determined in process 604 matched the ground truth for sentence "everyone who works there (the host, the bartender, the servers) is so helpful," while term polarity for aspect term "bartender" was incorrectly determined in process 504.

Some examples of computing devices, such as computing device 100 may include non-transitory, tangible, machine readable media that include executable code that when run by one or more processors (e.g., processor 110) may cause the one or more processors to perform the processes of methods 400-600. Some common forms of machine readable media that may include the processes of methods 400-600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for generating a sentiment analysis, the system comprising:
- a memory configured to store an aspect-based sentiment analysis (ABSA) generative language model; and
- a processor coupled to the memory and configured to execute instructions that cause the ABSA generative model to perform operations, the operations comprising:
  - receiving a sentence expressing a sentiment of a user; and
  - generating at least one pair including an aspect term in the sentence and a term polarity associated with the aspect term.

2. The system of claim 1, wherein the ABSA generative language model is a generative pre-trained transformer (GPT) model.

3. The system of claim 1, wherein the aspect term is at least one word or a span of text in the sentence that is associated with the sentiment of the aspect term.

4. The system of claim 1, further comprising:
- training the ABSA generative language model to determine the aspect term using an aspect term extraction task.

5. The system of claim 1, further comprising:
- training the ABSA generative language model to determine the term polarity of the aspect term using an aspect term polarity task.

6. The system of claim 5, wherein a training dataset includes the sentence appended with the aspect term.

7. The system of claim 1, further comprising:
- receiving an aspect category from a predefined set of categories; and
- generating, using the ABSA generative language model, the sentence, and the aspect category, a category polarity associated with the aspect category, wherein the category polarity corresponds to the sentiment.

8. The system of claim 7, wherein the aspect category is conditioned on other terms in the sentence.

9. A system for generating a sentiment analysis, the system comprising:
- a memory configured to store an aspect-based sentiment analysis (ABSA) generative language model; and
- a processor coupled to the memory and configured to execute instructions that cause the ABSA generative model to perform operations, the operations comprising:
  - receiving a sentence expressing a sentiment of a user and an aspect category from a predefined set of categories; and
  - generating, using the ABSA generative language model, the sentence, and the aspect category, a category polarity associated with the aspect category, wherein the category polarity corresponds to the sentiment.

10. The system of claim 9, further comprising:
- training the ABSA generative language model to determine the category polarity associated with the aspect category using an aspect category polarity task.

11. The system of claim 10, wherein a training dataset includes the sentence appended with the aspect category and the category polarity.

12. The system of claim 9, further comprising:
- receiving, together with the aspect category an aspect term; and
- generating, using the ABSA generative language model, the sentence, and the aspect term, a term polarity associated with the aspect term, wherein the term polarity corresponds to the sentiment of the aspect term.

13. The system of claim 12, further comprising:
- training the ABSA generative language model to determine the term polarity associated with the aspect term using an aspect term polarity task.

14. A non-transitory computer readable medium having instructions stored thereon, that when executed by a processor, cause the processor to perform operations, the operations comprising:
- receiving, at an aspect-based sentiment analysis (ABSA) generative language model, a sentence expressing a sentiment of a user; and
- generating, at the ABSA generative language model, at least one pair including an aspect term in the sentence and a term polarity associated with the aspect term.

15. The non-transitory computer readable medium of claim 14, wherein the ABSA generative language model is a generative pre-trained transformer (GPT) model.

16. The non-transitory computer readable medium of claim 14, wherein the aspect term is at least one word or a span of text in the sentence that is associated with the sentiment of the aspect term.

17. The non-transitory computer readable medium of claim 14, further comprising:
- training the ABSA generative language model to determine the aspect term using an aspect term extraction task.

18. The non-transitory computer readable medium of claim 14, further comprising:

training the ABSA generative language model to determine the term polarity of the aspect term using an aspect term polarity task.

19. The non-transitory computer readable medium of claim 18, wherein a training dataset includes the sentence appended with the aspect term and the term polarity.

20. The non-transitory computer readable medium of claim 14, further comprising:

receiving an aspect category from a predefined set of categories; and generating, using the ABSA generative language model, the sentence, and the aspect category, a category polarity associated with the aspect category, wherein the category polarity corresponds to the sentiment.

* * * * *